US007372362B2

(12) United States Patent
Ho Lee

(10) Patent No.: US 7,372,362 B2
(45) Date of Patent: May 13, 2008

(54) SECURITY ALARM SYSTEM HAVING MINIMAL WIRING TO CCTV CAMERA

(75) Inventor: John Kam Ho Lee, Hong Kong (CN)

(73) Assignee: Leeds Electronic Engineering Ltd. (HK)

( * ) Notice: Subject to any disclaimer, the term of this patent is extended or adjusted under 35 U.S.C. 154(b) by 29 days.

(21) Appl. No.: 11/392,344

(22) Filed: Mar. 29, 2006

(65) Prior Publication Data

US 2007/0236349 A1 Oct. 11, 2007

(51) Int. Cl.
*G08B 13/00* (2006.01)
(52) U.S. Cl. ............... 340/541; 340/568.2; 340/568.3; 340/568.4; 348/152
(58) Field of Classification Search ........... 340/541, 340/568.2, 568.3, 568.4; 348/152
See application file for complete search history.

(56) References Cited

U.S. PATENT DOCUMENTS

2003/0132843 A1* 7/2003 Ho Lee ................ 340/568.2

* cited by examiner

*Primary Examiner*—Benjamin C. Lee
*Assistant Examiner*—Samuel J. Walk
(74) *Attorney, Agent, or Firm*—Jackson Walker, LLP

(57) ABSTRACT

A security alarm system includes a camera, an alarm control panel, a mixer at the camera, a signal processor at or associated with the alarm control panel, and a single cable comprising only two operative conductors extending between the mixer and the signal processor. The cable provides current to the camera via the mixer and provides a tamper circuit as well as conveying video signals to the signal processor.

5 Claims, 4 Drawing Sheets

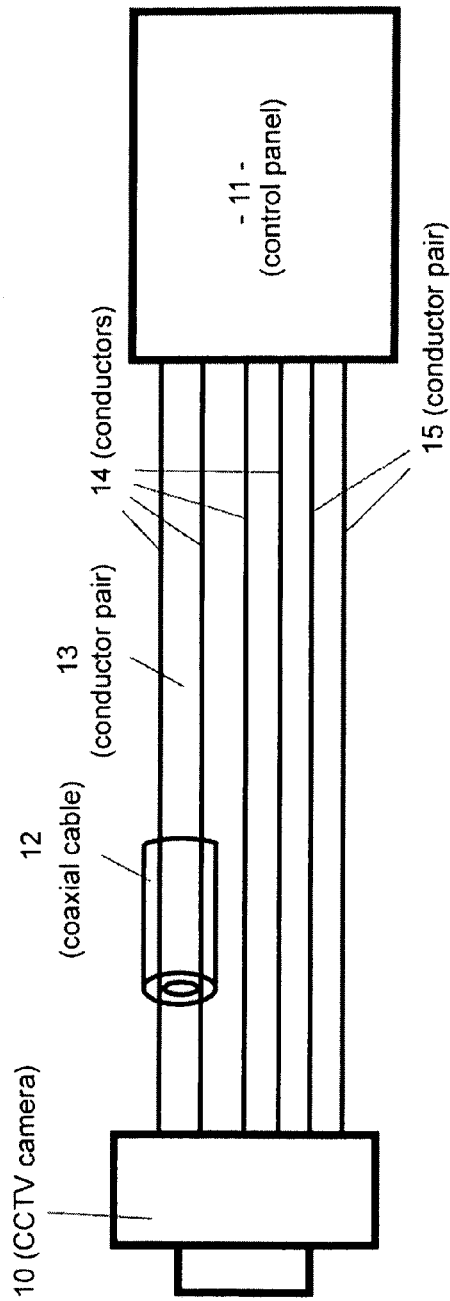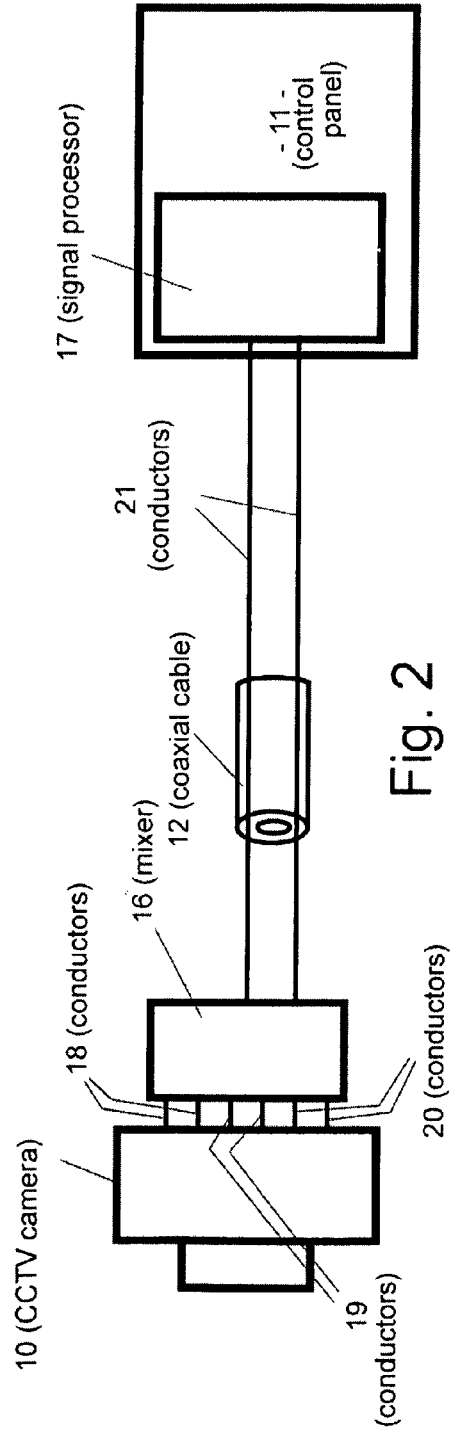

SECURITY ALARM SYSTEM HAVING MINIMAL WIRING TO CCTV CAMERA

FIELD OF THE INVENTION

Hard-wired security alarm systems for domestic and commercial applications include a number of event sensors such as passive infra-red detectors (PIRs) situated around or within a monitored space for detecting heat that is radiated from a person moving in the area. Once that movement is detected by a particular event sensor an alarm is triggered by a control panel to which the PIR is hard wired.

CCTV video monitoring systems on the other hand comprise one or more cameras for monitoring activity for display on a monitor and/or recording to tape or disc. Each camera normally requires two pairs of wires—one pair (comprising two conductors) for carrying a DC power supply to the camera (one conductor for positive and the other for negative), and another pair (comprising two conductors typically of a 75Ω coaxial cable) to carry a video signal.

An alarm system incorporating CCTV monitoring would also benefit from another pair or conductors for providing a tamper signal should an intruder sever the video cable to and the additional conductors and induce an intruder tamper signal for detection at a main control panel. Such a hypothetical set-up is depicted in FIG. 1.

The generation of such a tamper signal is similar in concept to a tamper switch that opens when an intruder lifts the cover off a bell/strobe light box of an alarm system.

DESCRIPTION OF THE PRIOR ART

As can be seen in FIG. 1, ordinary technology would require six conductors extending between each camera and the alarm control panel—one pair of conductors 13 (typically the centre conductor and shield of a 75Ω coaxial cable); one pair of conductors 14 for providing DC electrical power to the camera; and another pair of conductors 15 providing a tamper circuit.

OBJECTS OF THE INVENTION

It is an object of the present invention to minimise the required number of conductors between a camera and an alarm control panel in a security alarm system.

DISCLOSURE OF THE INVENTION

There is disclosed herein a security alarm system comprising:
- a camera,
- an alarm control panel,
- a mixer at the camera,
- a signal processor at or associated with the alarm control panel, and
- a single cable comprising only two operative conductors extending between the mixer and the signal processor, the cable providing current to the camera via the mixer and providing a tamper circuit as well as conveying video signals to the signal processor.

Preferably, during steady state operation, the mixer receives a steady current from the signal processor and wherein any video signal output change from the camera changes the current at the mixer and in the cable.

Preferably, the signal processor converts said changed current in the cable into a voltage signal for output to a video monitor and/or recorder.

Preferably, the signal processor is adapted to detect low or zero current in the cable if severed and generate a tamper signal.

Preferably, the cable is a coaxial cable.

BRIEF DESCRIPTION OF THE DRAWINGS

As noted above, a hypothetical prior art CCTV camera connected to an alarm control panel by a cable comprising six conductors is depicted in FIG. 1.

A preferred form of the present invention will now be describe by way of example with reference to FIGS. 2 to 8 of the accompanying drawings, wherein:

FIG. 2 is a schematic illustration a CCTV camera connected to an alarm control panel by a coaxial cable comprising only two conductors;

DESCRIPTION OF THE PREFERRED EMBODIMENT

Figure 3:
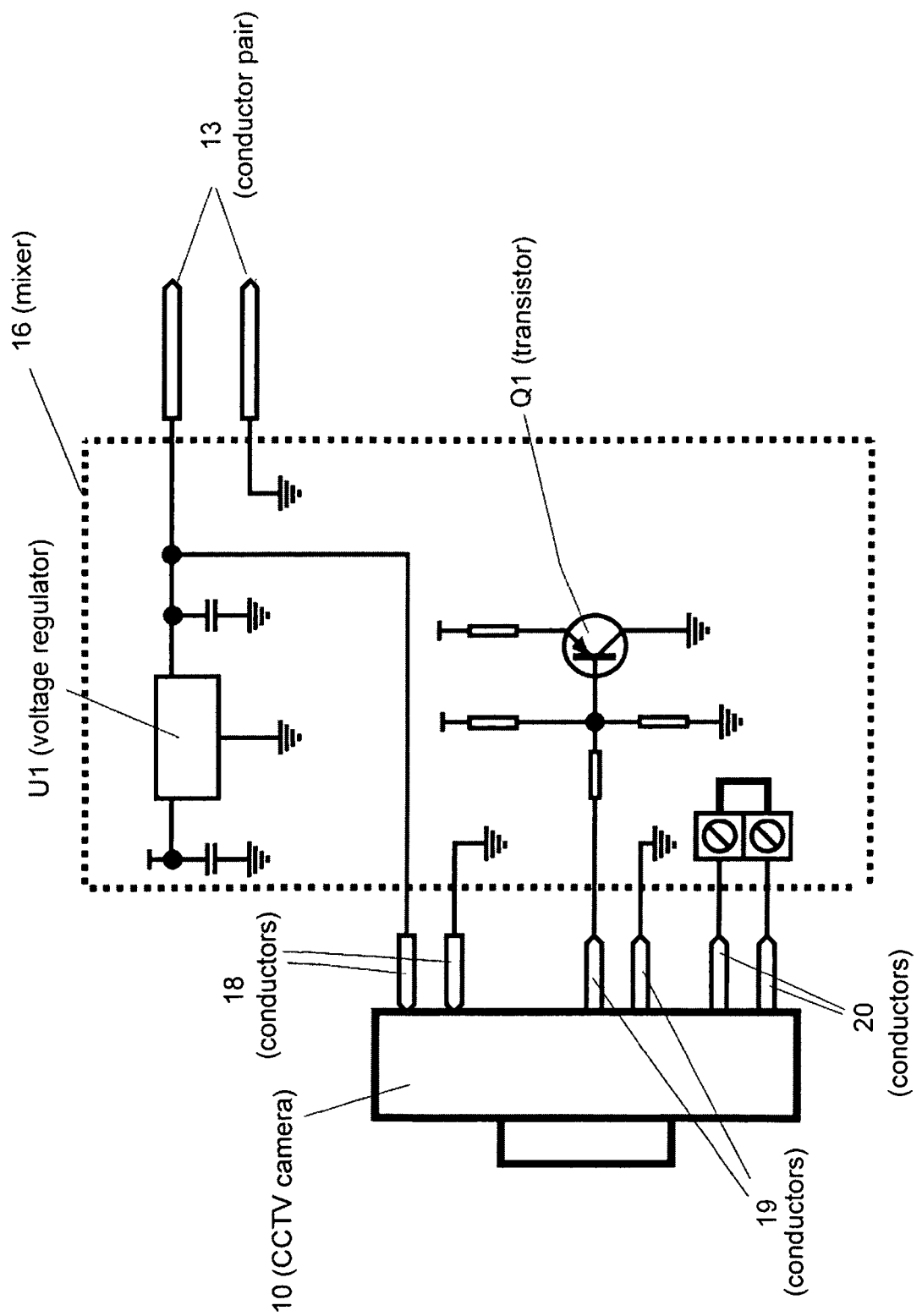
FIG. 3 is a schematic circuit diagram of a mixer for connection between the camera and the two-conductor coaxial cable.

The present invention does away with the need for long lengths of six-conductor (13, 14 and 15) cable between CCTV cameras 10 and the alarm control panel 11 and instead only requires equivalent lengths of two-conductor coaxial cable 12 as shown in FIG. 2.

To this end, the preferred embodiment of the invention provides a mixer 16 located at each camera 10 and connected thereto by six very short local conductors 18, 19 and 20. Conductors 18 provide the camera with DC positive and ground respectively. Conductors 19 are for video output from the camera and video ground respectively, and conductors 20 provide a tamper loop between the camera 10 and the mixer 16.

The Mixer 16 has only a single (coaxial) cable 12 extending to the signal processor 17 at the control panel 11. The cable 12 comprises just two conductors 21, both of which are operative—one of which would be the central core conductor, and the other—the braiding and/or foil separated from the central core conductor by dielectric material such as PTFE or air core polyurethane for example.

FIG. 3 shows the circuitry of the mixer 16. U1 is a voltage regulator for the mixer circuitry and transistor Q1 is a current converter. Resistors and capacitors are shown by their conventional symbols.

Figure 4:
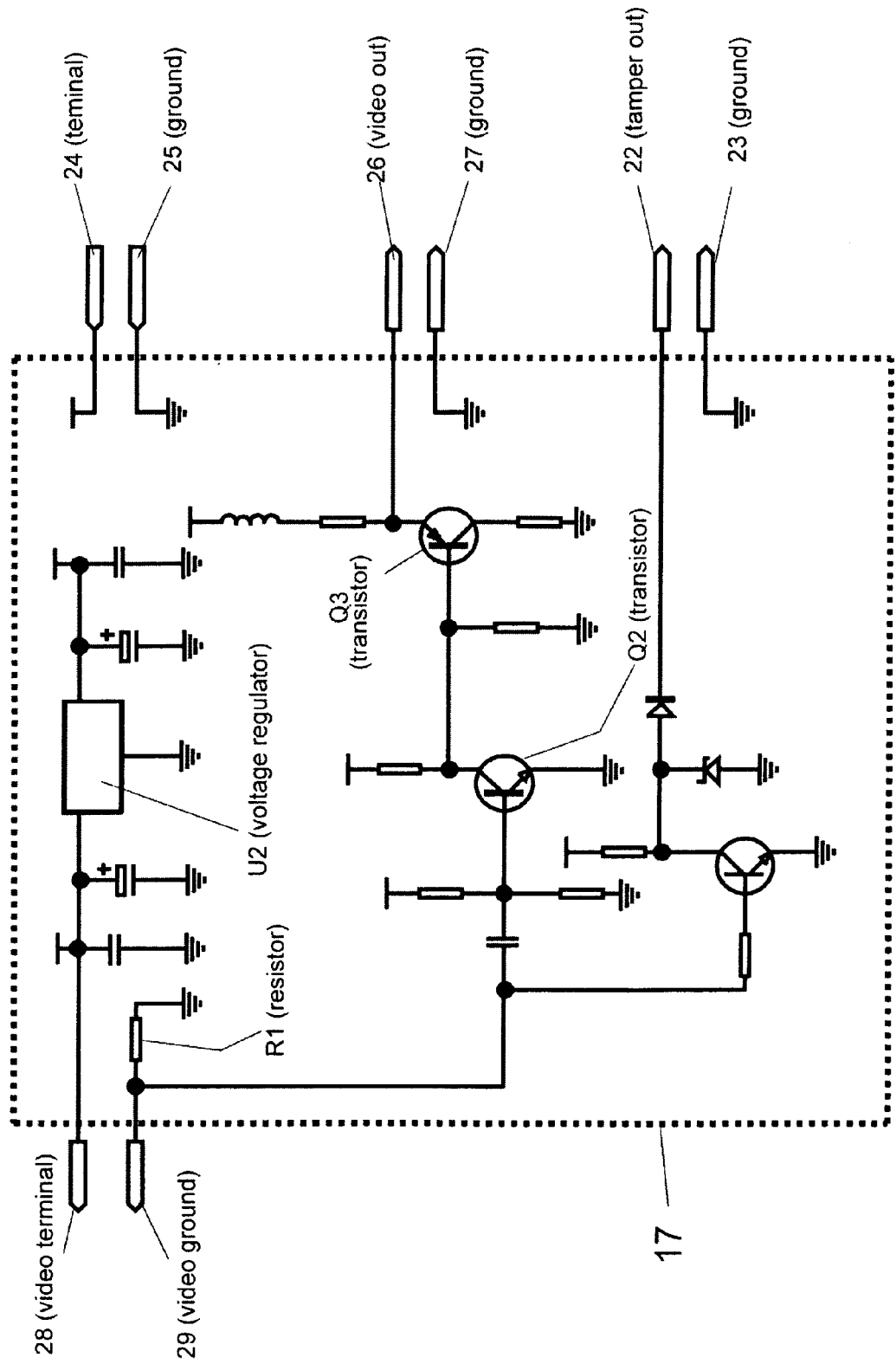
FIG. 4 is a schematic circuit diagram of the signal processor for connection to the other end of the two conductor coaxial cable and to an alarm control panel and video monitor.

FIG. 4 shows the circuitry of the signal processor 17. U2 is a voltage regulator for the signal processor circuitry. Transistors Q2 and Q3 are used as voltage amplifiers. R1 is a voltage detector resistor for the input voltage signal of Q2. Transistor Q1 is a tamper signal detector. A tamper out terminal 22 and its associated ground terminal 23 are provided for connection to the alarm control panel. A video out terminal 26 and its associated ground terminal 27 are provided for connection to a video monitor and/or recorder.

In the normal steady operational state (both video signal and normal steady current in the coaxial cable) the voltage at the tamper out terminal 22 is low (approximately zero volts). If the line (coaxial cable) 12 is severed, the tamper output voltage across terminals 22 and 23 increases to approximately 5 volts. Terminal 28 is for connection to the central core conductor of the coaxial cable 12 and ground terminal 29 is for connection to the braiding or foil sheathing of the coaxial cable 12.

Figure 5:
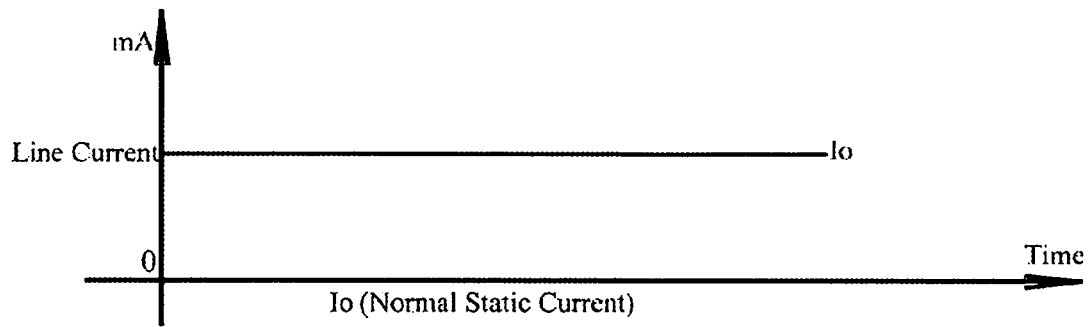
FIG. 5 depicts a waveform of current in the coaxial cable vs. time in a normal steady state.
Figure 6:
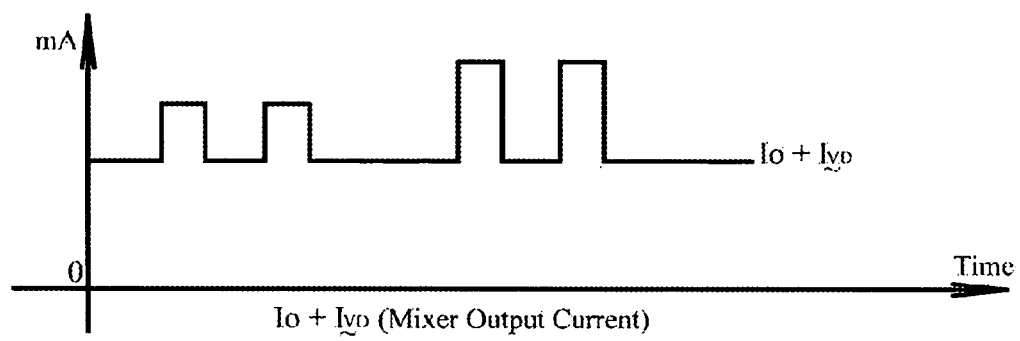
FIG. 6 depicts a waveform of mixer output current vs. time.
Figure 7:
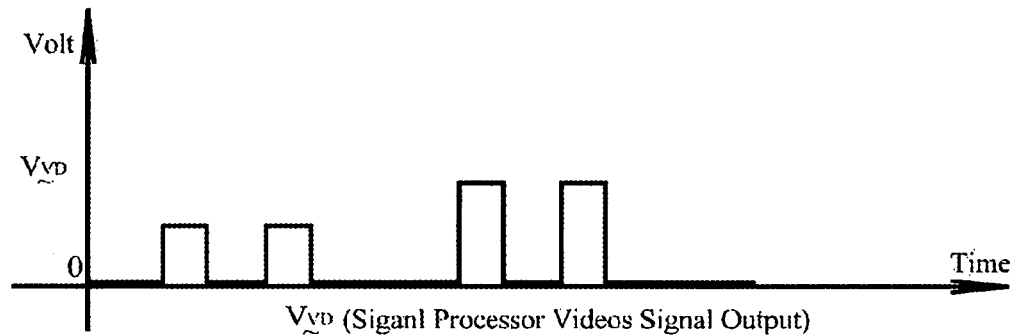
FIG. 7 depicts a waveform of signal processor video signal output voltage vs. time.
Figure 8:
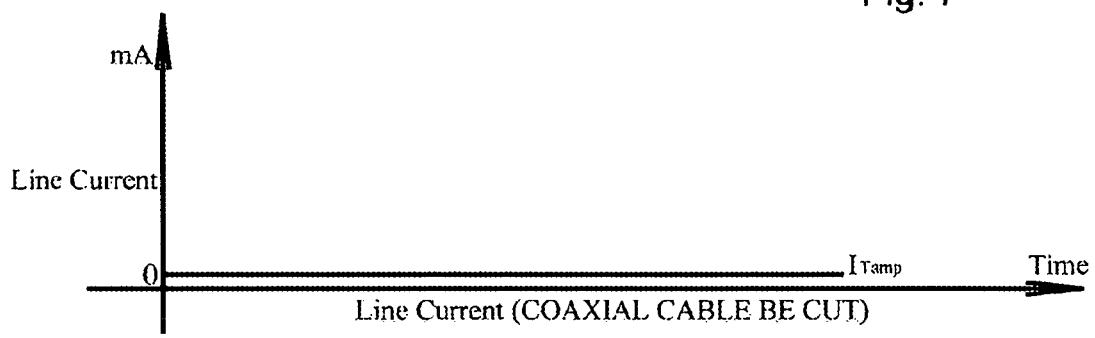
FIG. 8 depicts a waveform of current vs. time when the coaxial cable is severed.

During steady state operation, the signal processor 17 sends a constant static current to the mixer 16 via terminal 28 and the coaxial cable and as shown in FIG. 5. Any video signal output change from the camera will change the current at the mixer and in the coaxial cable 12 as shown in FIG. 6. The signal processor 17 will convert that current signal into a voltage signal as shown in FIG. 7 for output across terminals 26 and 27 for display on the video monitor and/or recording. If an intruder severs the coaxial cable, the current in the coaxial cable will drop to very low or zero at the signal processor 17. Then an alarm signal will be sent to the microprocessor in the main control panel via terminals 24 and 25 and as shown in FIG. 8.

The present invention can provide a significant material and cost savings for the installation of an alarm system incorporating a CCTV capability.

It should be appreciate that modifications and alternations obvious to those skilled in the art are not to be considered as beyond the scope of the present invention. For example, rather than providing a separate signal processor 17, the signal processor could be incorporated integrally with the main circuitry of the control panel. Similarly, the mixer 16 could be integrated into the video output circuitry of a camera. Furthermore, the line between the mixer and the signal processor need not be a coaxial cable and might alternatively be a simple two conductor twisted pair for example. Furthermore, audio signals/circuitry could be incorporated in the two-conductor system in addition to, or alternatively to the video circuitry described herein. That is, in conjunction with or instead of a camera, a microphone could be connected to the mixer and an audio speaker and/or audio recorder could be connected to the signal processor together with or instead of the display monitor.

The invention claimed is:

1. A security alarm system comprising:
   a camera,
   an alarm control panel,
   a mixer at the camera,
   a signal processor at or associated with the alarm control panel, and
   a single cable comprising only two operative conductors extending between the mixer and the signal processor, the cable providing current to the camera via the mixer and providing a tamper circuit as well as conveying video signals to the signal processor.

2. The security system of claim 1, wherein the mixer receives a steady current from the signal processor and wherein any video signal output change from the camera changes the current at the mixer and in the cable.

3. The security system of claim 2, wherein the signal processor converts said changed current in the cable into a voltage signal for output to a video monitor and/or recorder.

4. The security system of claim 1, wherein the signal processor is adapted to detect low or zero current in the cable if severed and generate a tamper signal.

5. The security system of claim 1, wherein the cable is a coaxial cable.

* * * * *